United States Patent [19]

Kiya et al.

[11] Patent Number: 4,656,405
[45] Date of Patent: Apr. 7, 1987

[54] TAPPING MACHINING METHOD

[75] Inventors: Nobuyuki Kiya; Motoaki Yoshino, both of Tokyo, Japan

[73] Assignee: Fanuc Ltd, Minamitsuru, Japan

[21] Appl. No.: 795,937

[22] PCT Filed: Feb. 4, 1985

[86] PCT No.: PCT/JP85/00044
§ 371 Date: Oct. 1, 1985
§ 102(e) Date: Oct. 1, 1985

[87] PCT Pub. No.: WO85/03468
PCT Pub. Date: Aug. 15, 1985

[30] Foreign Application Priority Data

Feb. 3, 1984 [JP] Japan ................................ 59-018083

[51] Int. Cl.⁴ ............................................. G05B 19/24
[52] U.S. Cl. ...................................... 318/571; 318/39; 318/606; 408/10; 364/474
[58] Field of Search ......................... 318/39, 571, 606; 408/10-13; 364/474

[56] References Cited

U.S. PATENT DOCUMENTS 4,346,444 8/1982 Schneider et al. ............. 318/571 X
4,353,018 10/1982 Kohzai et al. ..................... 318/571
4,441,059 4/1984 Watanabe ............................. 318/39
4,571,687 2/1986 Fukuyama et al. ............ 318/571 X Primary Examiner—Benjamin Dobeck
Attorney, Agent, or Firm—Staas & Halsey

[57] ABSTRACT

A tapping machining method for moving a tapping tool to a commanded position in synchronism with rotation of a spindle, to subject a workpiece to threading, and thereafter rotating the spindle in the reverse direction and withdrawing the tapping tool from the workpiece in synchronism with rotation of the spindle. The steps of the tapping machining method include moving and positioning a spindle, namely the tapping tool (4), from an initial point (Pi) to an approach point (Pr) in the depth direction (along the Z axis) while being rotated at a constant velocity. Then a pulse distribution calculation is started by using the pitch of a screw and pulses of a frequency proportional to the rotational velocity of the spindle, and threading is performed while the tapping tool is moved toward a target position (Pe) by the distributed pulses. Next, a spindle reverse rotation command is produced for rotating the spindle in the reverse direction without halting the pulse distribution calculation, even when the tapping tool arrives at the target position (Pe). Thereafter, the tapping tool is moved in the depth direction in synchronism with rotation of the spindle during forward due to inertial rotation. The tapping tool (4) is raised up to the approach point (Pr) by the distributed pulses after the spindle rotates in the reverse direction at a point (Pm), and the pulse distribution operation is ended after the tapping tool arrives at the approach point (Pr).

6 Claims, 4 Drawing Figures

TAPPING MACHINING METHOD

BACKGROUND OF THE INVENTION

This invention relates to a tapping machining method for moving a tapping tool to a commanded position in synchronism with rotation of a spindle to subject a workpiece to threading, thereafter rotating the spindle in the reverse direction and withdrawing the tapping tool from the workpiece in synchronism with rotation of the spindle.

In tapping machining, a tapping tool mounted on a spindle is moved relative to a workpiece in the depth direction in synchronism with rotation of the spindle to subject the workpiece to a predetermined threading operation. The spindle is subsequently rotated in the reverse direction and the tapping tool is moved relative to the workpiece in the withdrawing direction in synchronism with rotation of the spindle, to withdraw the tapping tool from the workpiece.

FIG. 1 is a cross-sectional view for describing such a tapping machining method. A workpiece 3 in which a bore has been formed in advance is placed upon a table 1. A helical cutting edge 5 is formed on the outer periphery of a tapping tool 4 mounted on a spindle (not shown). A female screw 6 is formed in the workpiece 2 when the tapping tool is moved relative to the workpiece 2 along the bore 2 in synchronism with the rotation of the spindle.

In such tapping machining, the sequence followed is to move the tapping tool to a commanded position in the depth direction (along the Z axis) in synchronism with rotation of the spindle, halt the movement of the tapping tool in the depth direction after the commanded position is reached, then reverse the rotation of the spindle and move the tapping tool in a direction which will withdraw it from the workpiece. Though a spindle reverse rotation command for reversing the rotation of the spindle is issued after the commanded position is reached, the spindle does not reverse instantaneously but continues rotating forwardly for a time due to inertia. The screw threads will be flattened and a highly precise tapping machining operation will be impossible unless the tapping tool is moved in the depth direction during the inertial rotation of the spindle. Accordingly, the conventional practice is to use an elongatable tool, referred to as a tapper, as the tapping tool. The tapper is adapted to elongate during interial rotation and contract during withdrawal, and is capable of moving in the depth direction even during inertial rotation.

However, the tapper is costly since it is specially contrived. To cut a screw having a large diameter, moreover, the tapper itself must be large in size, thus resulting in structural problems. In addition, the bottom of the bore cannot be cut to a high precision when the tapper is used. Accordingly, there is a need for a method whereby tapping can be carried out with good precision using a rigid tapping tool that is not elongatable. Heretofore, however, the aforementioned problem of screw thread flattening caused by inertial rotation has not been solved.

SUMMARY OF THE INVENTION

Accordingly, an object of the present invention is to provide a tapping machining method which solves the aforementioned problem caused by inertial rotation, thereby enabling a highly precise tapping operation to be carried out.

Another object of the present invention is to provide a tapping machining method through which highly precise tapping can be performed with a rigid tapping tool by continuing a pulse distribution calculation, rather than halting the pulse distribution calculation, even when the tapping tool reaches a commanded position in the depth direction, moving the tapping tool in the depth direction, as long as the spindle is rotating forwardly, by using distributed pulses generated by the pulse distribution calculation, moving the tapping tool in the withdrawal direction when the spindle rotation reverses, and halting the pulse distribution calculation when the tapping tool arrives at a tapping starting position.

Still another object of the present invention is to provide a tapping machining method whereby the tapping tool can be withdrawn from the workpiece in the course of a tapping operation in response to generation of a tap return signal.

A further object of the present invention is to provide a tapping machining method whereby highly precise machining is possible without a situation occurring wherein the tapping tool moves in the depth direction when the spindle is rotated in the reverse direction, even if there is a servo system delay.

A pulse distribution calculation is performed based on pulses of a frequency proportional to the rotational velocity of a spindle and on the pitch of a screw, pulses obtained by the pulse distribution calculation are fed into a servo circuit to move a tapping tool in the depth direction, thereby subjecting a workpiece to a predetermined threading operation. When the tapping tool arrives at a commanded depth, the pulse distribution calculation is continued without pause, a spindle reverse rotation command is generated, the tapping tool is thenceforth moved in the depth direction by the distributed pulses as long as the spindle rotates forwardly due to inertia, the tapping tool is moved in the withdrawal direction by the distributed pulse after spindle rotation reverses, and the pulse distribution calculation is halted when the tapping tool arrives at, e.g., a tapping starting position. According to the present invention, a rigid tapping tool can be used and, moreover, highly precise tapping can be performed.

DESCRIPTION OF THE PREFERRED EMBODIMENTS

Figure 1:
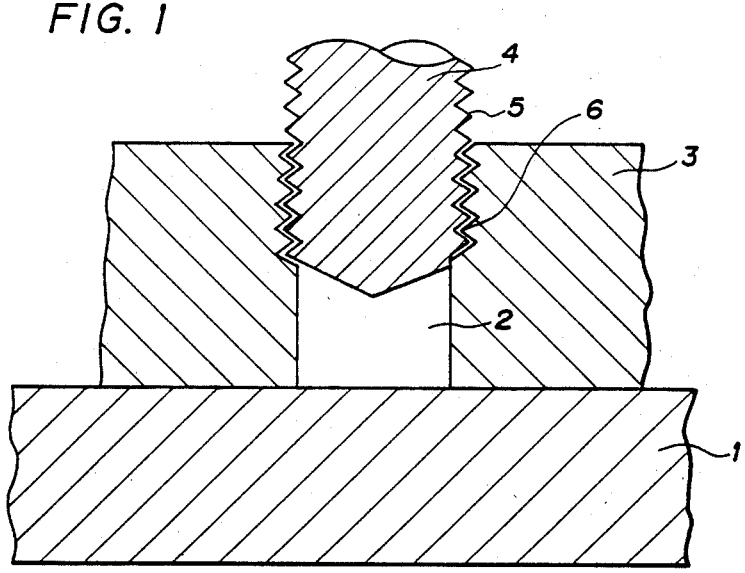
FIG. 1 is a schematic cross-sectional view for describing a tapping machining operation.
Figure 2:
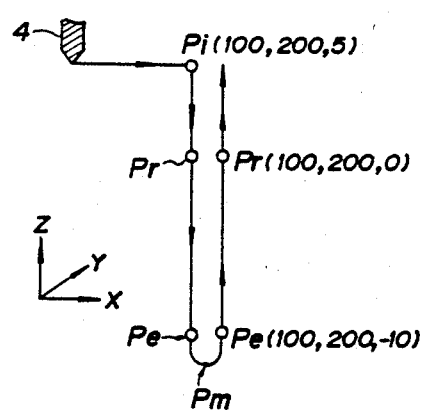
FIG. 2 is a diagram for describing a tool trajectory in a tapping machining method according to the present invention.

FIG. 2 is a diagram for describing a tool trajectory in a tapping machining method according to the present invention. A spindle, namely the tapping tool 4, is moved to an initial point Pi at rapid traverse along the X and Y axes simultaneously while being rotated at a constant velocity. The tapping tool is then moved at rapid traverse in the depth direction (along the Z axis)

to an approach point Pr. Thereafter, a pulse distribution calculation is started based on screw pitch and pulses of a frequency proportional to the rotating velocity of the spindle, in synchronism with a one-revolution signal generated by a position coder attached to the spindle motor. Threading is performed while the tapping tool is moved toward a target point Pe by the distributed pulses. A spindle reverse rotation command for reversing the rotation of the spindle is issued after the tapping tool arrives at the target point Pe. During the subsequent forward rotation of the spindle due to inertia, the tapping tool is moved by the distributed pulses in the depth direction in synchronism with the rotation of the spindle. The spindle reverses rotation at a point Pm, after which the tapping tool is raised by the distributed pulses to the approach point Pr. After the approach point Pr is reached, the pulse distribution calculation based on the pitch of the screw is ended. Thereafter, the spindle is rotated forwardly at the approach point Pr and the tapping tool is positioned at the point Pi by rapid traverse, thereby concluding the tapping machining operation. The machining program for the tapping machining operation shown in FIG. 2 is as follows:

M03;                                    (1)
G90G84X100.Y200.Z-10.R0.0F1.0;          (2)

In the above program, (1) is an M-function instruction "M03" for rotating the spindle in the forward direction, and (2) is a block commanding a canned cycle for tapping, in which "G90" is a G-function instruction signifying an absolute command, and "G84" is a G-function instruction signifying a canned cycle command for tapping. Further, three-dimensional positional coordinate values of the point (target point Pe) at the bottom of the bore are specified by the numerical values following the letters of the alphabet "X", "Y", "Z", the tapping starting position (positional coordinate value of the approach point Pr) along the Z axis are specified by the numerical value following the alphabetic character R, and the amount of tapping tool movement per revolution of the spindle 1, namely the length (mm/rev) of one pitch of the screw, is specified by the numerical value (1.0) following the alphabetic character F.

Figure 3:
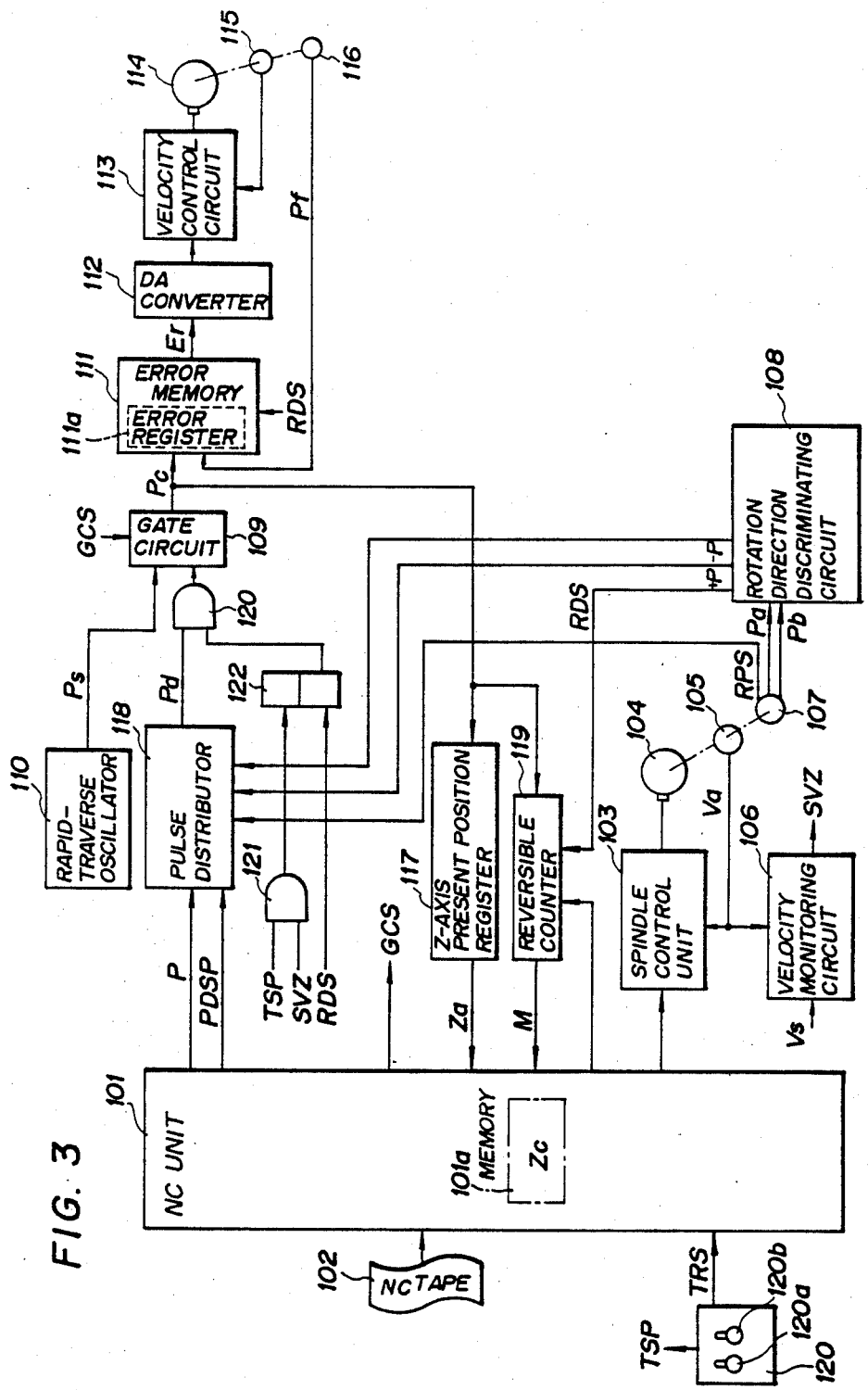
FIG. 3 is a block diagram of an apparatus for practicing the tapping machining method of the present invention.

FIG. 3 is a block diagram of an embodiment of the present invention and is for describing the tapping operation shown in FIG. 2.

An NC unit 101 performs NC processing for tapping by reading, one block at a time, a machining program stored in a memory (not shown), or on an NC tape 102. As an example, when the item of NC data "M03;" indicated at (1) above is read, the NC unit 101 delivers the spindle forward-rotation instruction to a spindle control unit 103 through an interface circuit (not shown). The spindle control unit 103 thus drives a spindle motor 104. The rotational velocity of the spindle motor 104 is sensed by a tachogenerator 105, which feeds the rotational velocity Va back to the spindle control unit 103. As a result, the spindle control unit 103 drives and controls the spindle motor 104 in dependence upon a difference between a preset commanded velocity and the actual rotational velocity Va, in such a manner that the difference is made to approach zero. The actual rotational velocity Va of the spindle motor 104 is also applied to a velocity monitoring circuit 106. A pulse generator 107, such as a position coder, generates a one-revolution pulse RPS with every revolution of the spindle, and generates a set of position pulses Pa, Pb, which are 90° out of phase, whenever the spindle rotates by a predetermined amount. It should be noted that n-number (e.g., 4096) of each of these position pulses is generated per revolution of the spindle. A rotation direction discriminating circuit 108 monitors the phases of the position pules Pa, Pb. When the phase of the position pulses Pa leads that of the position pulses Pb, the rotation direction discriminating circuit 108 regards this as being indicative of forward rotation and produces positive pulses +P of a frequency identical to that of the position pulses. When the phase of the position pulses Pb lags behind that of the position pulses Pb, the rotation direction discriminating circuit 108 regards this as being indicative of reverse rotation and produces negative pulses −P of a frequency identical to that of the position pulses. Further, the rotation direction discriminating circuit 108 produces a reverse rotation signal RDS when the spindle is rotating in the reverse direction.

When processing based on the item of NC data (1) ends, the NC unit 101 reads the tapping canned cycle block (2) and performs ordinary simultaneous two-axis control along the X and Y axes based on the X- and Y-axis command values contained in the block. When the tapping tool has been positioned at the initial point Pr by simultaneous two-axis control along the X and Y axes, the NC unit 101 stores the positional coordinate value "0.0" of the approach point Pr, which value follows the letter of the alphabet "R", as a commanded positional coordinate value Zc in an internal memory 101a. The NC unit 101 also delivers a control signal GCS to a gating circuit 109. As a result, the gating circuit 109 outputs rapid-traverse pulses Ps, which are received from a rapid-traverse oscillator 110, as command pulses Pc. The command pulses Pc are applied to an error memory 111 to update incrementally the contents of an internal error register 111a in the positive or negative direction, depending upon the direction of movement (i.e., the direction in which the spindle is rotating). A DA converter 112 delivers an analog voltage as a velocity command to a velocity control circuit 113, thereby driving a Z-axis motor 114. The analog voltage is proportional to the content (error) Er of the error register 111a. The rotational velocity of the spindle motor 114 is sensed by a tachogenerator 115, which feeds the velocity back to the velocity control circuit 113 as a velocity feedback signal. When the Z-axis motor 114 rotates through a predetermined angle, the pulse coder 116 generates one feedback pulse Pf, which is fed back to the error memory 111 as a position feedback signal, thereby updating the content of the error register 111a incrementally in the negative or positive direction, depending upon the direction of movement. Thus, under steady-state conditions, the content of error register 111a becomes constant and the Z-axis motor 114 rotates at the commanded velocity (rapid-traverse velocity), so that the tapping tool is moved toward the approach point Pr (FIG. 2). Meanwhile, the command pulses Pc from the gate circuit 109 are also applied to a Z-axis present position register 117, the content of which is updated incrementally in accordance with the direction of movement. The content of the Z-axis present position register 117 thus comes to indicate the present position Za along the Z axis. The NC unit 101 is constantly checking whether a commanded position Zc and present position Za have attained equality. When the condition Za=Zc is attained, the NC unit 101 delivers the control signal GCS to the gating circuit 109 to sever the connection between the rapid-traverse oscillator 110 and error memory 11, form a connection between a pulse distributor 118 and the error memory 111, and clear the status of a reversible counter 119 to zero. Further, the NC unit 101 stores the position data "−10.0", which follows the letter of the alphabet "Z", in the memory 101a as the commanded position Zc, and sets the numerical value (i.e., pitch; hereafter denoted by the character P), which follows the letter of the alphabet F, in an internal register of the pulse distributor 118.

When the pitch P (=1.0) is applied thereto, the pulse distributor 118 produces distributed pulses Pd by performing a well-known pulse distribution calculation based on a DDA interpolation calculation or an MIT method, in synchronism with the one-revolution signal RPS generated by the position coder 107, each time the positive pulse +P or negative pulse −P is generated by the rotation direction discriminating circuit 108. These distributed pulses Pd are applied to a servo circuit (which refers to the circuitry from the error memory 111 onward) as the command pulses Pc from the gating circuit, whereby the tapping tool is moved along the Z axis (depth direction) in the manner described above. The number N of distributed pulses Pd produced by the pulse distributor 118 per revolution of the spindle is as follows:

$$N = k \cdot n \cdot p$$

$$N = K \cdot P$$

where n is the number of positive or negative pulses +P, −P, respectively, generated per revolution of the spindle, and k, K are constants. Accordingly, if the tapping tool moves by 1/K (mm) per command pulse Pc, the tapping tool will move P (mm) per revolution, so that a screw having a pitch length P (mm) will be cut.

When the present position Za along the Z axis becomes equal to the commanded position Zc as a screw proceeds to be cut through the foregoing processing, the NC unit 101 delivers the spindle reverse rotation command to the spindle control unit 103. The pulse distributor 118, it should be noted, continues performing the pulse distribution operation.

When the spindle reverse rotation command is issued, the spindle control unit 103 exercises control so as to rotate the spindle motor 104 in the reverse direction. Due to inertia, however, the spindle motor 104 does not reverse rotation immediately but continues rotating in the forward direction for a period of time.

Since the pulse distributor 118 continues to perform the pulse distribution calculation, the distributed pulses Pd for moving the tapping tool in the depth direction are generated as long as the spindle motor 104 rotates due to inertia. As a result, the tapping tool moves in the depth direction beyond the target point Pe in performing the threading operation (see FIG. 2).

When the rotation of the spindle motor 104 reverses at the point Pm, the rotation direction discriminating circuit 108 generates the negative pulses −P. The pulse distributor 118 performs the pulse distribution calculation based on the negative pulses −P and pitch P and thus generates distributed pulses Pd the polarity of which is opposed to that of the pulses produced during the threading operation. As a result, the tapping tool is moved in the withdrawal direction along the screw threads already cut.

The reversible counter 119 counts up the command pulses Pc during forward rotation of the spindle and counts down these pulses during reverse rotation of the spindle. The counted value M therefore indicates the distance from the approach point Pr to the tapping tool.

Accordingly, when the tapping tool is withdrawn, the NC unit 101 determines whether the counted value M in reversible counter 119 has become zero. When the condition M=0 is attained, namely when the tapping tool arrives at the approach point Pr, the NC unit generates a pulse distribution stop signal PDSP to end the pulse distribution calculation. Thereafter, the NC unit 101 delivers a spindle forward rotation command to the spindle control unit 103 to rotate the spindle in the forward direction, thereby ending the tapping operation.

Figure 4:
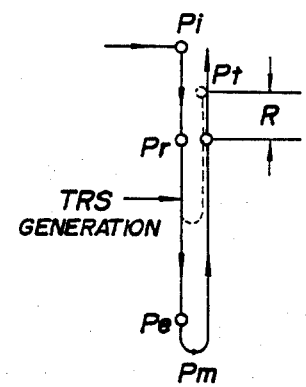
FIG. 4 is a diagram for describing a tool trajectory for a case where a tap return signal is generated.

A tap return operation is executed when a switch 120a provided on an operator's panel 120 is operated to apply a tap reverse signal during a threading operation performed by moving the tapping tool in the thickness direction. More specifically, when a tap return signal TRS is generated, the NC unit 101 generates the spindle reverse rotation command, even if the tapping tool has not reached the target point Pe, and presets the reversible counter 119 to M+R, where M denotes the counted value in the reversible counter 119 when the tap return signal is generated, and R represents the distance (FIG. 4), already known, from the approach point Pr to a tap return point Pt.

Thereafter, an operation is performed identical with that which follows the arrival at the target point Pe. When the numerical value in the reversible counter 119 becomes zero, namely when the tapping tool arrives at the point Pt, the NC unit 101 generates the pulse distribution stop signal PDSP to end the pulse distribution calculation. In this way the tapping tool is moved to the point Pt, as shown by the dashed line in FIG. 4, to end the tap return operation.

The foregoing description is for an ideal case where servo system delay is not taken into account. Due to the influence of servo system delay, however, the tapping tool may fail to move immediately in the withdrawal direction even if the spindle rotates in the reverse direction. Instead, the tapping tool may move in the withdrawal direction after it first moves in the thickness direction by an amount dependent upon servo system delay (which amount corresponds to, e.g., the number of pulses which have accumulated in the error register 111a). This can cause flattening of the screw threads. Therefore, according to the present invention, the problem caused by servo system delay is solved in a manner described hereinbelow. Note that where servo system delay is a factor, the status Za of the Z-axis present position register 117 indicates the position of the pulse distribution point and not the actual machine position.

When a switch 120b provided on the operator's panel 120 is set to enter a tracking stop signal TSP, a tracking stop operation, set forth hereinbelow, is executed after the pulse distribution point arrives at the target position (i.e., after the condition Za=Zc is established).

When the pulse distribution point reaches the target point Pe, the NC unit 101 generates the spindle reverse rotation command to slow down the rotational velocity of the spindle. The actual rotational velocity Va of the spindle motor 104 is sensed by the tachogenerator 105 and applied thereby to the velocity monitoring circuit 106. Here Va is compared with a preset velocity Vs.

When the actual rotational velocity Va is slowed down and attains the set velocity Vs, the velocity monitoring circuit 106 generates a velocity arrival signal SVZ. An AND gate 121 produces a "1" output in response to generation of the velocity arrival signal SVZ, thereby setting a flip-flop 122 to close an AND gate 120. As a result, the distributed pulses Pd produced by the pulse distributor 118 due to the rotational inertia of the spindle are no longer applied to the servo circuit. Accordingly, the tapping tool comes to a stop after moving in the depth direction a distance equivalent to the number of pulses that have accumulated in the error register 111a inside error memory 111 (i.e., a distance equivalent to the error Er in the error register). At the same time that movement stops, or a very short period of time after movement stops, the spindle begins rotating in the reverse direction. When this occurs, the rotation direction discriminating circuit 108 generates the reverse rotation signal RDS to reset the flip-flop 122, thereby opening the AND gate 120, so that negative-polarity distributed pulses Pd are applied to the servo circuit to start raising the tapping tool. Note that the foregoing is for an intance where the application of the distributed pulses Pd to the servo circuit is halted, until the spindle rotates in the reverse direction, when the actual rotational velocity Va of the spindle falls below the set velocity Vs in a case where the tracking stop signal TSP is entering from the switch 120b. However, the present invention is not limited to the case where the tracking stop signal TSP is entering from the switch 120b, for an arrangement can be adopted in which the application of the distributed pulses to the servo circuit is halted until the spindle rotates in the reverse direction in all cases. When the latter is the case, the switch 120b and AND gate 121 in FIG. 3 are unnecessary and the velocity arrival signal SVZ is applied directly to the set input terminal of flip-flop 122.

Further, in the foregoing, the spindle rotational velocity Va is monitored and, when the velocity falls below the set velocity Vs, the application of the distributed pulses Pd to the servo system is halted until the spindle rotates in the reverse direction. However, an arrangement is possible in which, rather than relying upon a method of directly monitoring the rotational velocity of the spindle, attainment of the set velocity by the actual rotational velocity of the spindle is predicted by using a different method. In response, the application of the distributed pulses Pd to the servo circuit is halted until the spindle rotates in the reverse direction. By way of example, though the spindle reverse rotation command is generated when the pulse distribution point arrives at the target point Pe (FIG. 2), an arrangement can be adopted in which the number of distributed pulses generated during the time taken for the spindle to reach a predetermined set velocity after generation of the spindle reverse rotation command (namely, the distance q traveled by the pulse distribution point during this period of time), is preset. Then, actual distance traveled by the pulse distribution point is monitored and, when this distance becomes equal to q, the application of the distributed pulses Pd to the servo circuit is halted until the spindle rotates in the reverse direction. With this method, q can be set in such a manner that the spindle rotates in the reverse direction when the tapping tool moves in the depth direction a distance equivalent to the number of pulses accumulated in the error register 111a inside the error memory 111 after the application of the distributed pulses Pd to the servo circuit is halted. This makes it possible to perform a highly precise tapping operation. As to the method of commanding q, the following NC data are used instead of the NC data commanding the tapping canned cycle indicated at (2) above:

$$G90G84X100.Y200.Z-10.R0.0F1.0Qq; \quad (3)$$

where the alphabetic character Q is a word address specifying the above-mentioned traveling distance q.

The NC unit 101 in FIG. 3 constantly checks whether $$Za = Zc + q$$

is satisfied by using the position Za of the pulse distribution point stored in the Z-axis present position register 117, the commanded position Zc stored in the memory 101a, and the traveling distance q. If the above equation is satisfied, the flip-flop 122 is set and the application of the distributed pulses Pd to the servo circuit is halted until reverse rotation of the spindle is completed (i.e., until the reverse rotation signal RDS attains the "1" level).

When the pulse distribution point reaches the target point Pe (FIG. 2) and the spindle reverse rotation command is generated, there are cases where the spindle begins rotating in the reverse direction before the actual machine position arrives at the target point Pe, as when the spindle rotational velocity is low. In such cases, the tapping tool is moved toward the target point and the screw threads are flattened, just as above, despite the fact that the spindle rotates in the reverse direction. Therefore, when performing tapping at a low rotational velocity, it is necessary to continue the forward rotation of the spindle until the actual machine position arrives at the target point. Accordingly, it can be arranged so that when the pulse distribution point arrives at the target point Pe, the spindle reverse rotation command is issued not immediately but upon passage of a predetermined period of time. If this is done, reverse rotation will begin when the actual machine position arrives at the target point Pe. According to the present invention, therefore, it is arranged to apply the NC data $$G90G84X100.Y200.Z-10.R0.0F1.0P\square\square; \quad (4)$$

to the NC unit 101 instead of the NC data in (2) above, halt the application of the distributed pulses Pd to the servo circuit as soon as the pulse distribution point arrives at the target point Pe, and then issue the spindle reverse rotation command upon passage of a predetermined period of time corresponding to the numerical value $\square\square$ which follows the alphabetic character P. In other words, when the condition Za=Zc is attained, the NC unit 101 sets the flip-flop 122 to halt the application of the distributed pulses Pd to the servo circuit, regards the letter P as an ordinary dwell command, performs dwell processing based on the numerical value following the letter P, and delivers the spindle reverse rotation command to the spindle control unit 103 upon passage of a predetermined period of time indicated by the numerical value $\square\square$. When the spindle rotates in the reverse direction (i.e., when the reverse rotation signal RDS attains the "1" level), the flip-flop 122 is reset and the tapping tool is raised in dependence upon the reverse rotation of the spindle.

Thus, according to the present invention as described above, a pulse distribution calculation continues rather than being stopped even when the tapping tool arrives at a commanded position in the depth direction. This enables the tapping tool to be moved in the depth direction as long as the spindle is rotating forwardly due to inertial rotation, and to be moved in the withdrawal direction when the spindle reverses in rotation. A highly precise tapping operation can be performed without flattening of the screw threads even if a rigid tapping tool is used.

Further, the pulse distribution calculation continues rather than being stopped even in a case where tapping is suspended in response to generation of a tap return signal. The tapping tool therefore moves in the depth direction as long as the spindle is rotating forwardly due to rotational inertia, and moves in the withdrawal direction after the spindle reverses rotation. As a result, highly precise tapping is carried out up to the position at which tapping is suspended.

Moreover, the arrangement is such that the distributed pulses are not applied to the servo circuit after spindle motor velocity following reversal of spindle rotation attains a preset low velocity, and such that the distributed pulses are reapplied to the servo circuit after the reversal of rotation. This makes it possible to eliminate situations in which machining precision is diminished due to movement of the tapping tool in the depth direction after spindle rotation has reversed.

What is claimed:

1. A tapping machining method comprising the steps of:
   (a) subjecting a workpiece to a predetermined thread cutting operation by performing a pulse distribution calculation based on pulses of a frequency proportional to a rotational velocity of a spindle and on a pitch of a screw;
   (b) applying pulses obtained by the pulse distribution calculation to a servo circuit to move a tapping tool in the depth direction;
   (c) continuing the pulse distribution calculation without pause and generating a spindle rotation reverse command when the tapping tool arrives at a commanded depth;
   (d) moving the tapping tool in the depth direction by the distributed pulses obtained by the pulse distribution calculation of said step (c) while the spindle is rotating in a forward direction due to inertia;
   (e) executing the following step after the spindle is rotated in the reverse direction:
      continuing the pulse distribution calculation based on pulses of a frequency proportional to a reverse rotation velocity and on the pitch of the screw, and withdrawing the tapping tool from the workpiece by moving the tapping tool in the withdrawal direction in accordance with the pulses obtained from the continued pulse distribution calculation.

2. A tapping machining method according to claim 1, further comprising the steps of storing a tapping starting position in advance and ending the continued pulse distribution calculation in said step (e) when the tapping tool returns to the tapping starting position.

3. A tapping machining method according to claim 1, wherein a tap return signal is generated, further comprising the step of rotating the spindle in the reverse direction when the tap return signal is generated.

4. A tapping machining method according to claim 1, wherein said step (e) comprises:
   determining whether the rotational velocity of the spindle has attained a predetermined rotational velocity after the spindle reverse rotation command is generated in said step (c);
   inhibiting application of the distributed pulses to the servo circuit until the spindle actually rotates in the reverse direction after the predetermined rotational velocity is reached; and
   reapplying the distributed pulses to the servo circuit when the spindle starts to rotate in the reverse direction.

5. A tapping machining method according to claim 1, wherein said step (e) comprises:
   setting a number q of distributed pulses generated until the spindle attains a predetermined rotational velocity after the spindle reverse rotation command is generated in said step (c);
   determining whether an actual number of distributed pulses following generation of the spindle reverse rotation command has attained the value q;
   inhibiting application of the distributed pulses to the servo circuit until the spindle actually rotates in the reverse direction after the actual number of distributed pulses has attained the value q; and
   reapplying the distributed pulses to the servo circuit when the spindle starts to rotate in the reverse direction.

6. A tapping machining method according to claim 1, wherein said step (c) comprises generating the spindle reverse rotation command a predetermined period of time after the tapping tool arrives at the commanded depth.

* * * * *